(12) United States Patent
Knittel et al.

(10) Patent No.: US 6,342,885 B1
(45) Date of Patent: Jan. 29, 2002

(54) METHOD AND APPARATUS FOR ILLUMINATING VOLUME DATA IN A RENDERING PIPELINE

(75) Inventors: James M. Knittel, Groton; Jan C. Hardenbergh, Sudbury; Hanspeter Pfister, Somerville, all of MA (US); Urs H. Kanus, Tuebingen (DE); Drew R. Martin, Medford, MA (US); Frederic H. Mokren, Bellevue, WA (US)

(73) Assignee: Tera Recon Inc., San Mateo, CA (US)

( * ) Notice: Subject to any disclaimer, the term of this patent is extended or adjusted under 35 U.S.C. 154(b) by 0 days.

(21) Appl. No.: 09/315,661

(22) Filed: May 20, 1999

Related U.S. Application Data

(63) Continuation-in-part of application No. 09/190,643, filed on Nov. 12, 1998.

(51) Int. Cl.[7] .............................................. G06T 15/00
(52) U.S. Cl. ....................................... 345/424; 345/424
(58) Field of Search ................................. 345/418, 419, 345/420, 421, 422, 423, 424, 425, 426

(56) References Cited

U.S. PATENT DOCUMENTS

| | | | |
|---|---|---|---|
| 5,201,035 A | | 4/1993 | Stytz et al. ................... 395/163 |
| 5,381,518 A | | 1/1995 | Drebin et al. ................. 395/124 |
| 5,467,459 A | | 11/1995 | Alexander et al. ........... 395/480 |
| 5,594,842 A | | 1/1997 | Kaufman et al. ............ 395/124 |
| 5,644,689 A | | 7/1997 | Ban et al. ..................... 395/124 |
| 5,734,384 A | * | 3/1998 | Yanof et al. .................. 345/424 |
| 5,751,928 A | * | 5/1998 | Bakalash ...................... 345/424 |
| 5,756,354 A | * | 5/1998 | Tzidon et al. ................ 345/424 |
| 5,760,781 A | * | 6/1998 | Kaufman et al. ............ 345/424 |
| 5,781,194 A | * | 7/1998 | Ponomarev et al. ......... 345/424 |
| 5,831,623 A | * | 11/1998 | Negishi et al. .............. 345/424 |

OTHER PUBLICATIONS

A. Mammen; "Transparency and Antialiasing Algorithms Implemented with the Virtual Pixel Maps Technique"; IEEE Computer Graphics & Applications, Jul., 1989; pp. 43–55.
J. Lichtermann; "Design of a Fast Voxel Processor for Parallel Volume Visualization"; pp. 83–92.
R. Drebin et al.; "Volume Rendering"; *Computer Graphics*, vol. 22 No. 4, Aug., 1988; pp. 65–74.
D. Voorhies et al.; "Virtual Graphics"; *Computer Graphics*, vol. 22 No. 4, Aug., 1988; pp. 247–253.

* cited by examiner

*Primary Examiner*—Cliff N. Vo
(74) *Attorney, Agent, or Firm*—Dirk Brinkman

(57) ABSTRACT

An apparatus illuminates samples in a volume rendering pipeline. The apparatus includes the following units. A gradient magnitude modulation unit produces an opacity, emissive, diffuse and specular modulation factor from a gradient magnitude vector of each sample. A reflectance mapping unit produces a diffuse intensity and a specular intensity from the gradient magnitude vector of each sample and an eye vector of the volume. A first arithmetic logic unit combines an opacity of each sample with the corresponding opacity modulation factor to generate modulated opacities. A second arithmetic logic unit combines an emissive coefficient with the emissive modulation factor of each sample to generate modulated emissive coefficients. A third arithmetic logic unit combines the diffuse intensity with the diffuse modulation factor of each sample to generate modulated diffuse intensities. A fourth arithmetic logic unit combines the specular intensity with the specular modulation factor of each sample to generate modulated specular intensities, and a lighting unit applies the modulated emissive coefficient, modulated diffuse and specular intensities to color components of the samples to illuminate the volume sample.

12 Claims, 15 Drawing Sheets

*GradientMagnitudeRange* (400)

| Register | Field Name | Bits | Format | Description |
|---|---|---|---|---|
| 1 | | 31:26 | | Reserved (must be zero) |
| | Max | 25:0 | unsigned 26 bits | Maximum gradient magnitude. |
| 0 | | 31:26 | | Reserved (must be zero) |
| | Min | 25:0 | unsigned 26 bits | Maximum gradient magnitude. |

| | | GradientMagnitudeModulation | |
|---|---|---|---|
| Bits | Field Name | Description | |
| 31:29 | grain | Defines the range covered by 1 GMLUT entry:<br>0: 1/128th the range: table covers 4K.<br>1: 1/256th the range: table covers 2K.<br>2: 1/512th the range: table covers 1K.<br>3: 1/1024th the range: table covers 512.<br>4 1/2048th the range: table covers 256.<br>5: 1/4096th the range:table covers 128. | 501 |
| 28:16 | base | Defines the starting point of the 13-bit selected index for applying the GMLUT entries. | 502 |
| 15 | upperRangeDefault | Specifies GMLUT output for the range above the range covered by the table entries. 0 = output is zero, 1 = output is full magnitude (0xfff == 1.0) | 503 |
| 14 | lowerRangeDefault | Specifies GMLUT output for the range below the range covered by the table entries. | 504 |
| 13 | indexSource | Specifies the source of the GMLUT index:<br>0: use gradient magnitude<br>1: use gradient magnitude squared upper bits | 504 |
| 12:6 | hiPassStart | Specifies a point in the gradient magnitude range of [0...127]. Gradients below this point produce a 0.0 output of the Hi-Pass block, else 1.0 | 505 |
| 5 | hiPassSpecular | When set, eliminates specular or diffuse lighting for samples below the point specified by hiPassStart. | 506 |
| 4 | hiPassDiffuse | | |
| 3 | modulateSpecular | When set, modulates the respective lighting intensity or opacity with the output of the GMLUT. Otherwise, when clear, no modulation is performed unless the *hiPassSpecular* or *highPassDiffuse* bits are set. | 507 |
| 2 | modulateDiffuse | | |
| 1 | modulateEmissive | | |
| 0 | modulateOpacity | | |

500

| Bits | Field Name | Format | Description |
|---|---|---|---|
| 63:52 | W | 11 bits | W component of eye vector |
| 51:48 | | | Reserved (must be zero) |
| 47:36 | V | 11 bits | V component |
| 35:32 | | | Reserved (must be zero) |
| 31:20 | U | 11 bits | U component. Note that the length of the vector must be 1. |
| 19:1 | | | Reserved (must be zero) |
| 0 | bypassRefVec | | When set, the gradient vector indexes the specular refmap. Otherwise, the reflection vector does. |

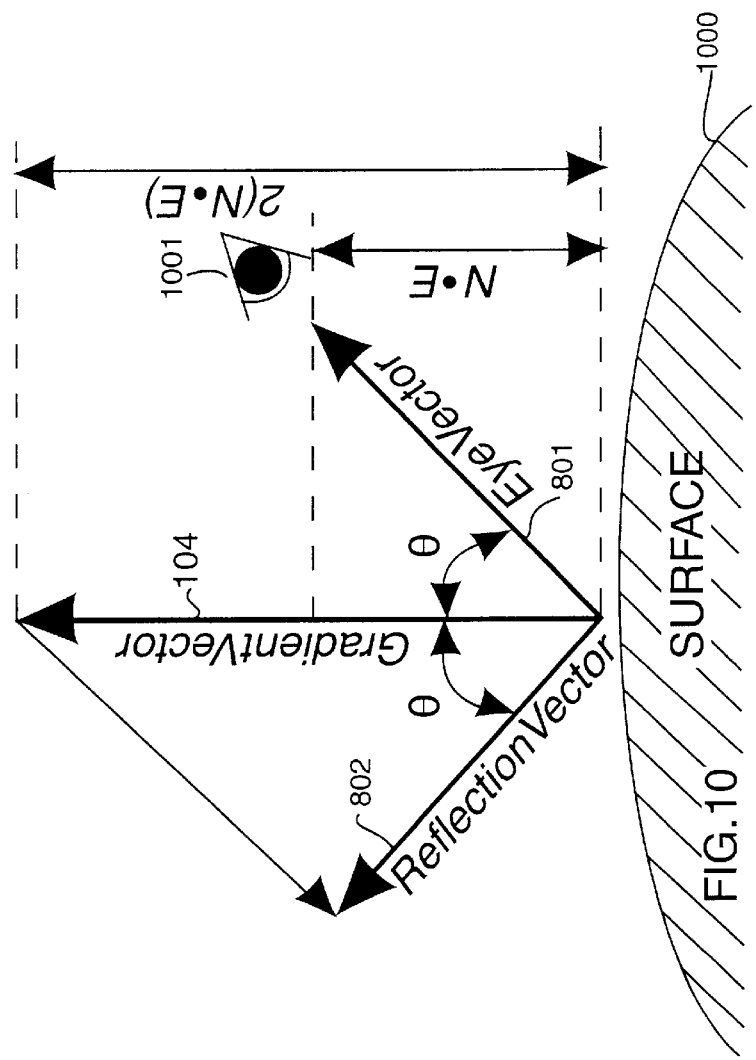
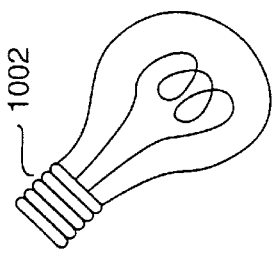
FIG.10
$R = 2N(N \cdot E) - E$
(for gradients of length 1)

METHOD AND APPARATUS FOR ILLUMINATING VOLUME DATA IN A RENDERING PIPELINE

CROSS REFERENCES TO RELATED APPLICATIONS

This application is a continuation in part of U.S. patent application Ser. No, 09/190,643 "Fast Storage and Retrieval of Intermediate Values in a Real-Time Volume Rendering System," filed by Kappler et al. on Nov. 12, 1998.

FIELD OF THE INVENTION

This invention relates generally to volume rendering, and more particularly, to illuminating classified RGBa samples of a volume in an illumination stage of a rendering pipeline.

BACKGROUND OF THE INVENTION

Introduction to Volume Rendering

Volume rendering is often used in computer graphics applications where three-dimensional data need to be visualized. The volume data can be scans of physical or medical objects, or atmospheric, geophysical, or other scientific models where visualization of the data facilitates an understanding of the underlying real-world structures represented by the data.

With volume rendering, the internal structure, as well as the external surface features of physical objects and models are visualized. Voxels are usually the fundamental data items used in volume rendering. A voxel is a data item that represents a particular three-dimensional portion of the object or model. The coordinates (x, y, z) of each voxel map the voxels to positions within the represented object or model.

A voxel represents some particular intensity value of the object or model. For a given volume, intensity values can be physical parameters, such as, density, tissue type, elasticity, velocity, to name but a few. During rendering, the voxel values are converted to color and opacity (RGBa) values which can be projected onto a two-dimensional image plane for viewing.

One frequently used technique during rendering is ray-casting. A set of imaginary rays are cast through the array of voxels. The rays originate from a viewer's eye or from an image plane. The voxel values are re-sampled to points along the rays, and various techniques are known to convert the sampled values to pixel values. Alternatively, voxel values may be converted directly to RGBa voxels, which are then re-sampled along rays and accumulated to pixel values. In either case, processing may proceed back-to-front, or front-to-back.

Rendering Pipeline

Volume rendering can be done by software or hardware. In one hardware implementation, the hardware is arranged as a multi-stage pipeline, see U.S. patent application Ser. No. 09/190,643 "Fast Storage and Retrieval of Intermediate Values in a Real-Time Volume Rendering System," filed by Kappler et al. on Nov. 12, 1998.

Illumination

Illumination is well-known in both art and computer graphics for increasing the realism of an image by adding highlights, reflections, and shadows, thereby appealing to one of the natural capabilities of the human eye to recognize three-dimensional objects. A number of prior art illumination techniques are known in computer graphics, generally involving complex calculations among the directions to each of the light sources, normal vectors to surfaces, and the position of the viewer. In polygon graphics systems, where the three-dimensional objects are depicted by partitioning their surfaces into many small triangles, the normal at each point on a surface is easily obtained from the specification of the triangle containing that point.

Naturally, it is a challenge for any graphics system to carry out these calculations quickly enough for real-time operation. One technique for performing them efficiently is described by Voorhies et al. in "Reflection Vector Shading Hardware," Computer Graphics Proceedings, Annual Conference Series, pp. 163–166, 1994. They describe a polygon graphics system in which the calculations involving the eye vector and light sources are partially pre-computed for a fixed set of directions and stored in lookup tables. During rendering, reflection vectors are used to index into these tables to obtain values for modulating the intensities of the red, green, and blue colors assigned to the points on the surfaces of the objects depicted in the image. The only calculations necessary in real-time are for obtaining reflection vectors themselves and for applying the modulation.

Applying illumination in volume graphics is more difficult because there are rarely any defined surfaces in a volume data set. Instead, visible surfaces must be inferred from the data itself, as discussed by Levoy in "Display of Surfaces From Volume Data," IEEE Computer Graphics and Applications, May, 1988, pp. 29–37. A common technique is to calculate gradients throughout the volume data set, that is the rates and directions of change of the voxel values with respect to position. At points where the gradient is strong, a surface or boundary between material types can be inferred, with the gradient pointing in the direction of the normal to the surface. The magnitude of the gradient indicates the sharpness of the surface. Traditional illumination techniques are then applied to modulate the color intensity and alpha values according to both the magnitude and direction of the gradient at each point in the volume, for example as described by Drebin, et al., in "Volume Rendering," Computer Graphics, August 1988, pp. 65–74. By this method, features which exhibit high gradient magnitudes are accentuated as surfaces, while features which exhibit low gradient magnitudes are suppressed.

Terwisschavan van Scheltinga et al. in "Design of On-Chip Reflectance Map," Eurographics 95 Workshop on graphics Hardware, pp. 51–55, 1995, describe an application of the technique of Voorhies et al. to volume rendering. In that technique, specular and diffuse intensities are pre-computed based on directions to light sources and the eye of the viewer. The intensities are then stored in lookup tables called reflectance maps. Gradient vectors are used to index into these tables to obtain the intensities for modulating rgba values at sample locations in order to produce specular and diff-use highlights.

The above illumination techniques suffer from an inability to distinguish object surfaces from noise. Meaningful illumination can only take place when the samples can unequivocally be classified as surface or non-surface samples. Prior illuminators are inadequate because the presence of noise can cause them to assign strong illumination to voxels within homogeneous material. Neither Voorhies nor van Scheltinga suggest, teach or show illumination in a pipelined manner. Furthermore, the above techniques suffer a performance penalty in having to reload the reflectance maps anytime a view on an object changes. They do suggest computing a specular reflection vector on-the-fly, based on the gradient and eye vectors, which would obviate the need to reload the specular reflectance map when the view direction changes.

Gradient Magnitude Approximation

In the past, the brute force approach to determining gradient magnitudes included obtaining the sum of the squares of the gradient vector components (u,v,w) of the gradient vector $G_{uvw}$, then deriving the square root of the this sum. This computation can be extremely hardware intensive, so software is often used. This is because the number of iterations necessary in doing a traditional square root calculation can be on the order of tens of steps.

The hardware necessary and the time allotted for such calculations is exceedingly complex and long, especially in view of a requirement for a real-time volume rendering, that needs to render at a rate of more than 500 million samples per second. Another prior art method for deriving gradient magnitude is by utilizing look-up tables, which suffers from the problem of the large number of gates required for any reasonable level of precision.

After having derived gradient magnitudes, it is desirable to provide the user with the ability to use the gradient magnitude to interactively modify the application of lighting or a sample's opacity. This gives the user the ability to accentuate certain features, the ability to cut out certain features, or the ability to create a wide variety of alterations to the rendered object.

It is desired to improve on these prior art deficiencies while illuminating volume data. More particularly, it is desired to perform efficient and flexible illumination as a stage of a hardware pipeline.

SUMMARY OF THE INVENTION

The invention provides an illumination stage to illuminate samples in a volume rendering pipeline. The illumination stage includes the following units.

A gradient magnitude modulation unit produces an opacity, emissive, diffuse and specular modulation factor from a gradient magnitude vector of each sample.

A reflectance mapping unit produces a diffuse intensity and a specular intensity from the gradient magnitude vector of each sample and an eye vector of the volume.

A first arithmetic logic unit combines an opacity of each sample with the corresponding opacity modulation factor to generate modulated opacities.

A second arithmetic logic unit combines an emissive coefficient with the emissive modulation factor of each sample to generate modulated emissive coefficients.

A third arithmetic logic unit combines the diffuse intensity with the diffuse modulation factor of each sample to generate modulated diffuse intensities.

A fourth arithmetic logic unit combines the specular intensity with the specular modulation factor of each sample to generate modulated specular intensities, and a lighting unit applies the modulated emissive coefficient, modulated diffuse and specular intensities to color components of the samples to illuminate the volume sample.

BRIEF DESCRIPTION OF THE DRAWINGS

FIG. 4 is a block diagram of a gradient magnitude range register;

FIG. 5 is a block diagram of a gradient magnitude modulation register;

FIG. 10 illustrates the reflection of an eye and reflection vector about a surface normal;

DETAILED DESCRIPTION OF PREFERRED EMBODIMENTS

Figure 1:
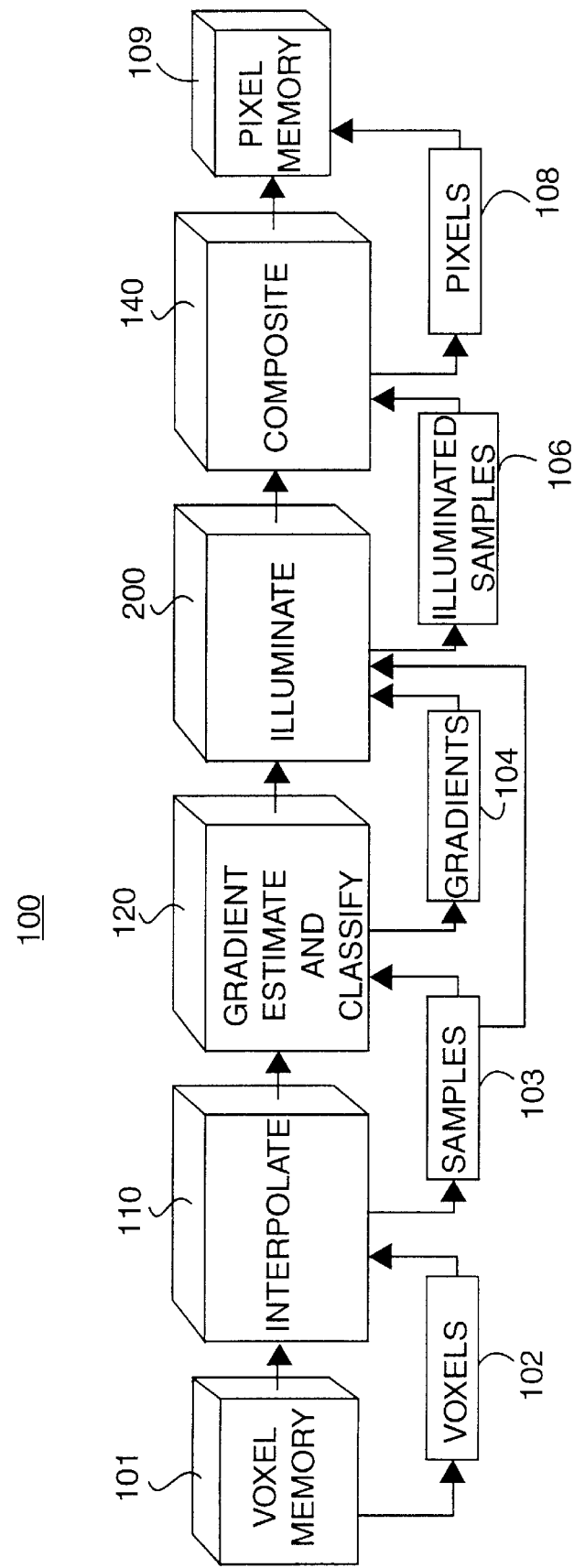
FIG. 1 is a block diagram of a rendering pipeline that uses the invention.

FIG. 1 shows a pipeline 100 that uses an illumination stage 200 according to the invention. The input to the pipeline is voxels 102 read from a voxel memory 101, and the output of the pipeline is pixels 108 written to a pixel memory 109.

The stages of the pipeline 100 interpolate 110 the voxels 102 for a particular point of view to produce samples 103. During interpolation, the neighborhood of a voxel is examined, and values are assigned to sample points along rays. Typically, re-sampling functions include linear, probabilistic, or nearest neighbor interpolation.

The samples 103 have their gradients 104 estimated 120. Gradients indicate the direction and magnitude of surface normals. The samples 103 are then classified. The classified samples are illuminated according to the invention using the estimated gradients 104 in stage 200. Last, the illuminated samples 106 are composited 140 to pixel values 108. In other embodiments, the order of the interpolation, gradient estimation, and classification stages may be different.

The flow of data in the pipeline of FIG. 1 makes it possible to achieve considerable parallelism in a semiconductor or hardware implementation. While one group of data are being read from voxel memory 101, a previously read group is interpolated in the interpolation stages 110, a group read before that is having gradients estimated and being classified in stages 120, etc. The pipeline reads a fixed number of voxels in each cycle, and these progress through the pipeline stage-by-stage and cycle-by-cycle. Therefore, even though the number of stages and length of time needed for rendering an individual voxel or sample may be large, many voxels are processed at any one time.

Illumination Stage

Figure 2:
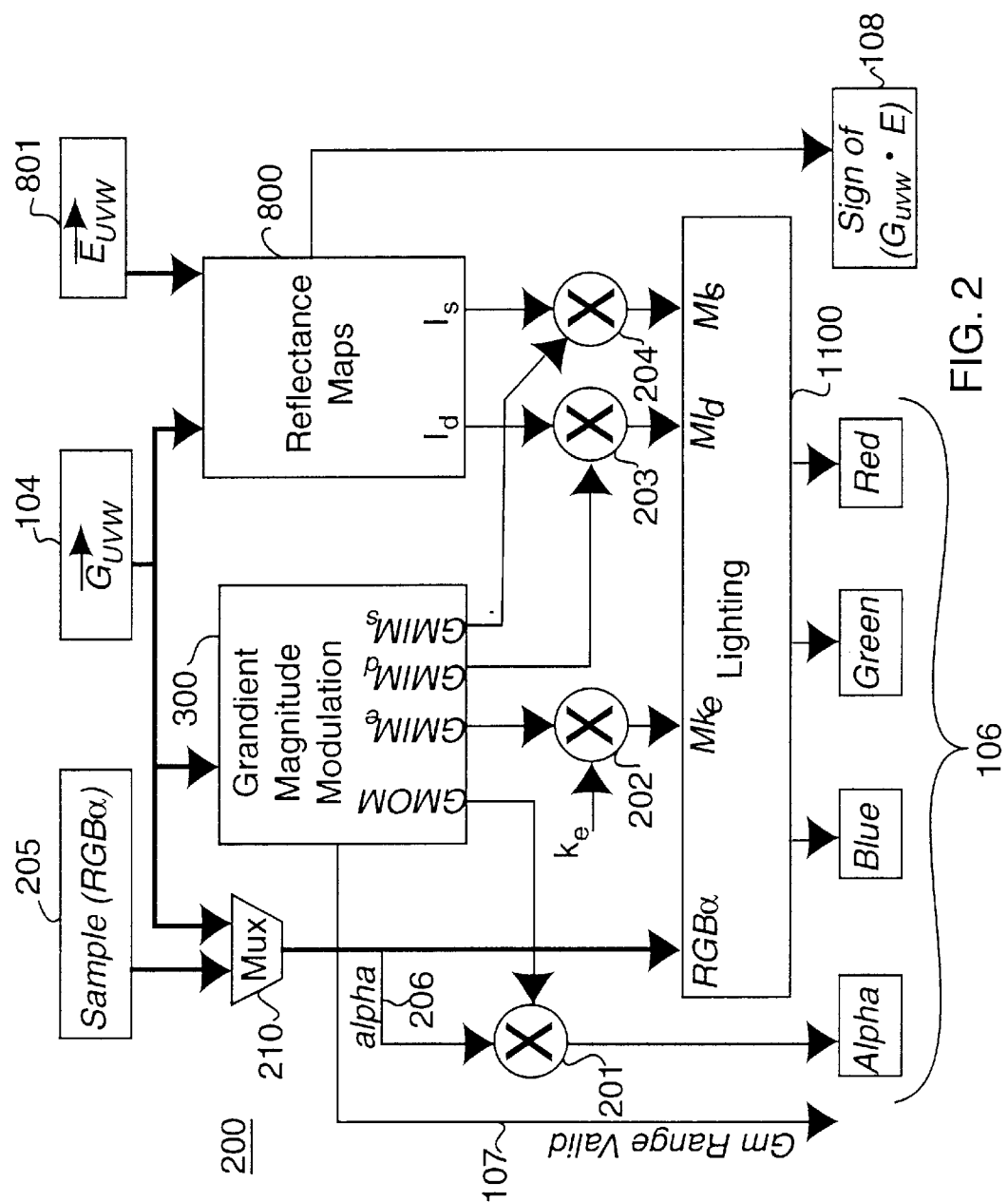
FIG. 2 is a block diagram of an illumination stage of the pipeline according to the invention.

FIG. 2 shows an illumination stage 200 for a hardware rendering pipeline according to the invention. The stage 200 includes three major units, namely gradient magnitude modulation 300, reflectance mapping 800, and lighting

1100. The stage 200 also includes four arithmetic logic units (ALUs), i.e., multipliers (⊗) 201–204, and a multiplexer (MUX) 210.

Each input to the stage 200 comprises an already classified sample 205 from the previous stage, its corresponding gradient vector ($G_{UVW}$) 104, and an eye vector ($E_{UVW}$) 801 representing the direction from the sample point to the eye of the viewer. The sample and its associated gradient vector are received at the rate of one pair per pipeline clock cycle. In a system in which volume rendering produces a parallel projection, the eye vector is constant throughout the volume. However, in the case of perspective projection, the eye vector must be adjusted for each ray.

The illumination stage 200 applies specular (s), diffuse (d) and emissive (e) lighting to the classified sample 205 using its associated gradient vector ($G_{UVW}$) 104, and other controls described in detail below. The illumination stage 200 according to the invention, in pipeline fashion, processes sample and vectors at the rate of one pair per pipeline clock cycle. That is, it comprises a fixed number of processing steps, and data flows through the stage in one direction from beginning to end. There are no loops, feedback, or variation in the number of steps of processing. Each of the sub-units of illumination stage 200 is likewise organized in pipeline fashion to accept inputs at the rate of one per cycle and to product outputs at the same rate.

The gradient vector 104 is provided as input to the modulation unit 300, and the reflectance map unit 800, described below. The modulation unit generates four gradient magnitude modulation factors GMOM, $GMIM_e$, $GMIM_d$, and $GMIM_s$. GMOM is the factor for opacity modulation, and the other three factors modulate color (RGB) intensities for emissive (e), diffuse (d), and specular (s) lighting, respectively. Modulation can be done in a number of different ways under user control.

GMOM modulates or attenuates (201) the alpha (opacity) component 206 of the classified sample 205, supplied via the mux 210. The mux 210 also receives GuvW in the case that the illumination stage is bypassed altogether. $GMIM_e$ is multiplied in 202 by $k_e$ where $k_e$ represents the intensity of the emissive lighting, a constant for the entire volume. The modulated $k_e$ is denoted by $Mk_e$. $GMIM_d$ is multiplied in 203 by $I_d$ to produce a modulated diffuse intensity $MI_d$. $GMIM_s$ is multiplied in 204 by $I_s$ to produce a modulated specular lighting intensity $MI_s$. The values $I_d$ and $I_s$ are provided via the reflectance mapping unit 800. $Mk_e$, $MI_d$, and $MI_s$ are inputs to the Lighting unit 1100, as described in FIG. 11.

The main output of the illumination stage 200 is an illuminated sample 106 with Red, Green, Blue color components, and an Alpha component. The other two outputs are GmRangeValid 107, and the sign 108 of the dot product of the gradient vector and the eye vector ($G_{UVW} \cdot E_{UVW}$). The value GmRangeValid is the result of comparing the computed gradient magnitude squared against a range defined in a range register. This signal can be used downstream in the compositing stage 140 of the pipeline 100 to further modify the resultant image by selectively including or excluding samples from being composited based upon their gradient magnitude.

The sign of the dot product indicates whether the gradient is front-facing or back-facing. This signal can also be used downstream in the compositing stage to identify a sample as being on a front-facing or back-facing surface. With this information, a simple segmentation of the volume data is possible. Like the input, the output is also clocked at the rate of one illuminated sample pipeline cycle.

Gradient Magnitude Modulation

Figure 3:
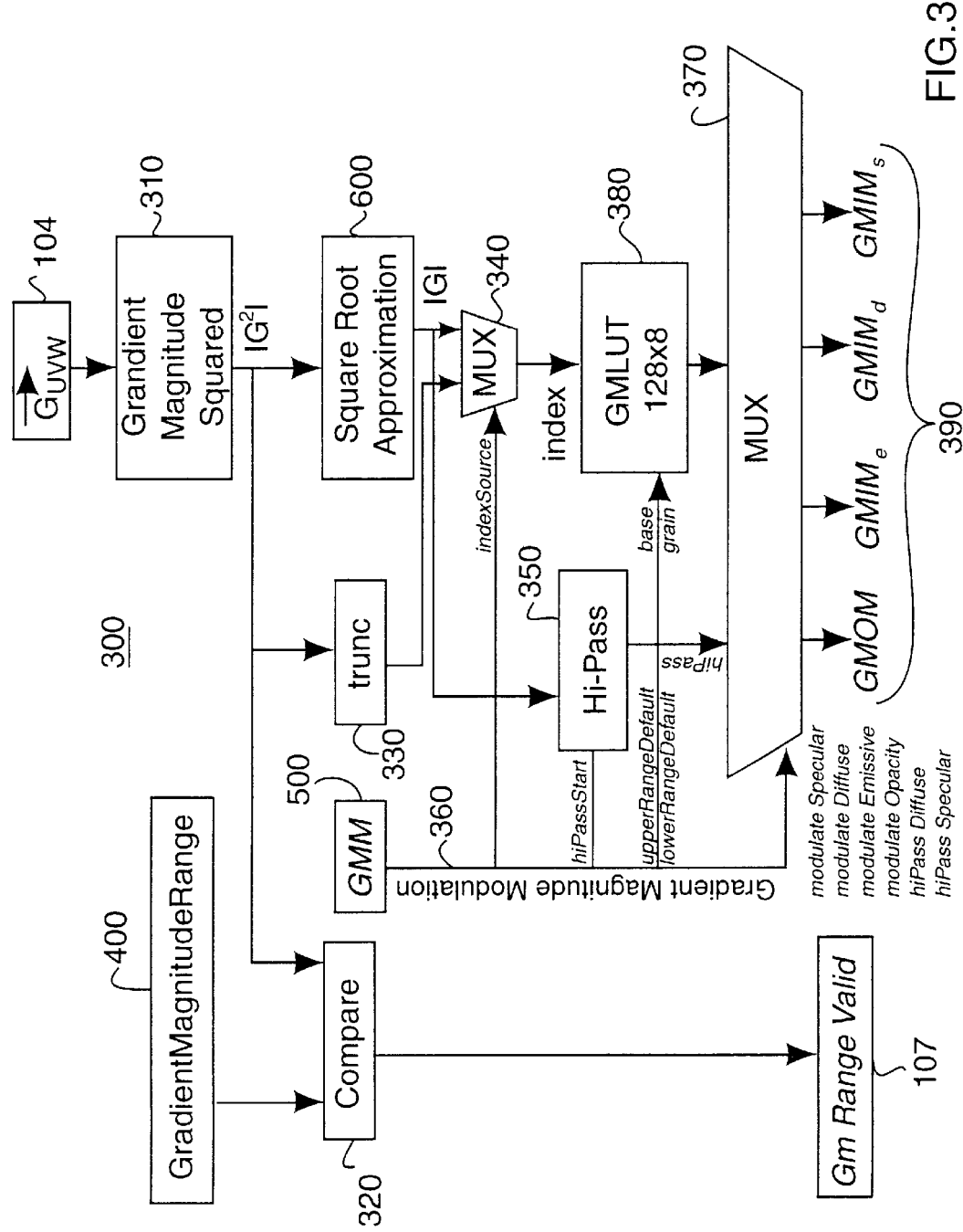
FIG. 3 is a block diagram of a gradient magnitude modulation unit.

FIG. 3 shows the gradient magnitude modulation unit 300 in greater detail. The purpose of the unit is to filter gradients using their magnitudes. Filtering accentuate surfaces, and removes noise.

The unit 300 includes an arithmetic logic unit 310 for taking the dot product of the gradient 104 with itself ($G_{UVW} \cdot G_{UVW}$), thereby obtaining the square of its magnitude $|G^2|$, and a unit 600 for taking the square root of $|G^2|$ described in greater detail with reference to FIGS. 12 and 13. The output of the squaring circuit 310 is supplied to a comparator 320 along with range values from a Gradient-MagnitudeRange register 400 shown in FIG. 4. The range values include a minimum and maximum valid magnitude. The output is also truncated by circuit 330, for example, a shift register, and then supplied to the multiplexer 340 along with $|G|$.

The output of the mux 340 is used to index a gradient magnitude look-up table (GMLUT) 380, the entries of which are representations of fractional numbers in the range zero to one, inclusive. The absolute value $|G|$ is also provided to a high pass filter (Hi-Pass) filter function 350. A signal selecting a particular modulation mode is provided on line 360 to a multiplexer 370. This signal is derived from a gradient magnitude modulation register (GMM) 500 shown in FIG. 5. The parameter values stored in the register 500 as bits can be supplied by the user. Possible modes include various combinations of specular, diffuse, emissive, opacity, high pass diffuse, and high pass specular.

Gradient Magnitude Modulation Register

As shown in FIG. 5, the GMM 500 includes fields 501–507 stored as 32 bits. The various bits control exactly how the user desires to have the modulation performed. The grain, base, upper and lower range, and index source field 501–504 are used in conjunction with the GMLUT 380. The two high pass fields 505–506 are used by the high pass function 350. Field 505 specifies a step value for a high pass filter function. Field 506 eliminates either specular or diffuse lighting, or both. The values in field 507 select a complex modulation mode for the mux 370 using the magnitude look-up table 380.

In other words, there are a total of thirty-two control bits in the GMM register 500 that control the application of the two modulation functions (Hi-Pass or GMLUT) to the four modulation outputs 390. GMOM and $GMIM_e$ can have either the GMLUT output or the value 1.0 applied to them based upon the setting of the modulateOpacity and modulateEmissive control bits 0 and 1, in the notation of the C programming language:

GMOM=modulateOpacity? GMLUT[|G|]: 1.0

$GMIM_e$=modulateEmissive? GMLUT[|G|]: 1.0.

Here, the "?" operator "asks" whether the named control bit is set or not in the GMM 500, and selects the first or second of the following two operands accordingly. $GMIM_d$ and $GMIM_s$ can have any of the four following values:

1.0, Hi-Pass (|G|), GMLUT[|G|], or Hi-Pass(|G|)* GMLUT[|G|].

Note, as shown above, it is possible to compound the two function values. Any of these four possible values can be independently selected for $GMIM_d$ and $GMIM_s$ as follows:

$GMIM_d$=(modulateDiffuse? GMLUT[|G|]: 1.0)

\* (hiPassDifJfuse? Hi-Pass(|G|): 1.0)

$GMIM_s$=(modulateSpecular? GMLUT[|G|]: 1.0)

\* ( hiPassSpecular? Hi-Pass(|G|): 1.0)

depending on the setting of the control bits of the GMM 500.

Gradient Magnitude Modulation Operation

The unit 300 determines the modulation (attenuation) factors GMOM, $GMIM_e$, $GMIM_d$, and $GMIM_s$ 390 according to the selection signal on line 360 and the gradient magnitude of the classified sample 205. The modulation factors can be applied to lighting parameters ($I_d$, $I_s$, and $k_e$) and the opacity of the sample.

The square ($|G^2|$) of the gradient magnitude is computed in unit 310 by taking the sum of the squares of the components of the gradient vector as follows:

$$|G^2|=(G_u*G_u)+(G_v*G_v)+(G_w*G_w)$$

The gradient vector components are in the range of [−4095, . . . , +4095]. Given this range, the range of the computed square of the gradient magnitude is [0, . . . , 50,307,075]. The GmRangeValid signal 107 is set as follows:

GmRangeValid=($|G^2|$>=GradientMagnitudeRange.Min) && ($|G^2|$<=GradientMagnitudeRange.Max).

where the GradientMagnitudeRange register 400 is shown in FIG. 4, and where "&&" is the logical AND operator notation of the C programming language.

The four modulation factors output by the modulation unit 300 are GMOM, $GMIM_e$, $GMIM_d$, and $GMIM_s$ 390. These outputs are in the range of [0.0, . . . 1.0]. As can be seen in FIG. 2 using multiplication logic, GMOM modulates the opacity (alpha) component of the sample, $GMIM_e$ modulates $k_e$, and thus emissive lighting, $GMIM_d$ modulates $I_d$, and thus diffuse lighting, and $GMIM_s$ modulates $I_s$, and thus specular lighting.

This modulation can be used for a variety of reasons: minimize or eliminate lighting contributions of non-surfaces; minimize or eliminate lighting contributions of samples with low gradients that might exist due to errors in sampling and/or interpolation or noise errors inherent in the volume data set; apply light to only those samples with gradients in a specific range; and include or exclude samples from being composited (GMOM). The modulation factor GMOM can, for instance, enable compositing of only homogenous regions by eliminating all surfaces or conversely, enable compositing of only surfaces.

As an advantage, two modulation functions are provided by the unit 300, namely a complex function using a gradient magnitude look-up table (GMLUT) 380, and the high pass filter function 350.

High Pass Filter Function

The high pass filter function operates on the approximated gradient magnitude. This step function produces a high pass modulation factor of either 0.0 or 1.0 to either side of a step value in the gradient magnitude range as defined by the hiPassStart field 505 of the GMM register 500, shown in FIG. 5. The following equation represents the step function:

hiPassOutput=($|G|$>=hiPassStart)? 1.0: 0.0.

Figure 6:
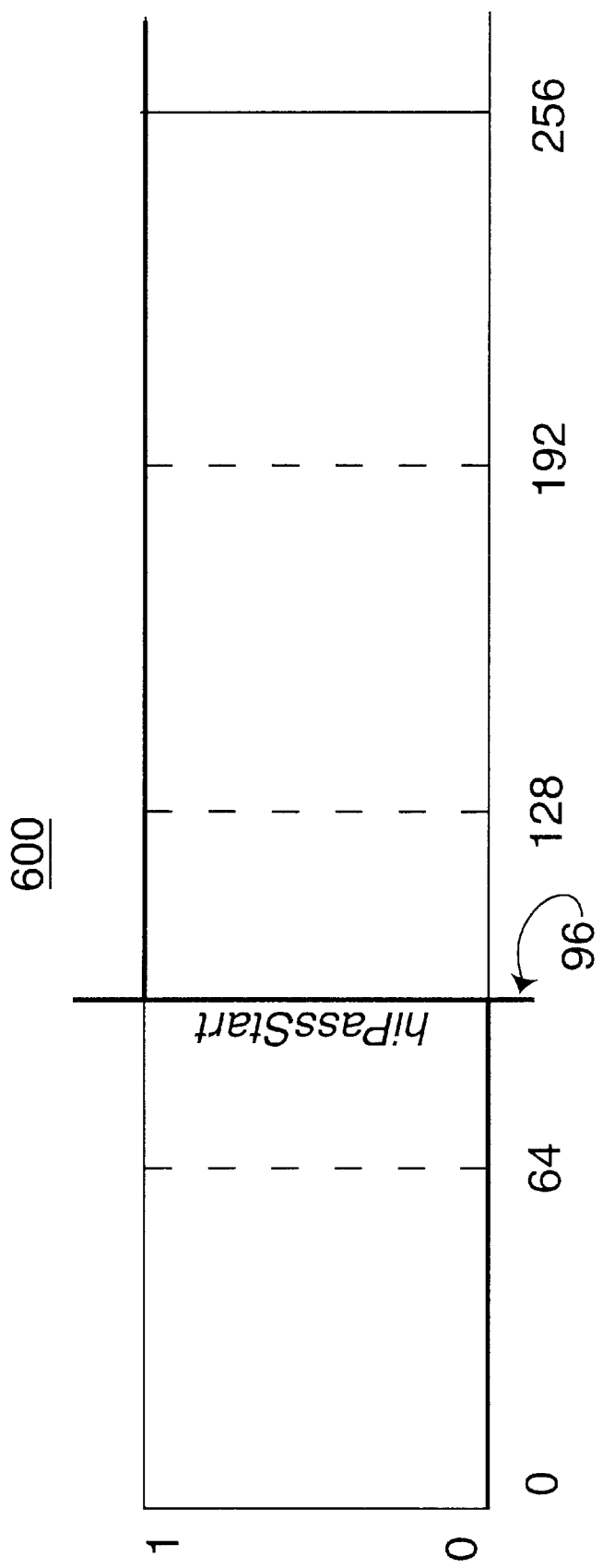
FIG. 6 is a graph of a high pass filter function.

FIG. 6 shows an example output 600 for this step function. The x-axis depicts the lower-end of the input gradient's magnitude range [0, . . . , 255], and the y-axis the magnitude of the high pass output. In this example, the step value hiPassStart is set to 96. Thus, for all samples with gradient magnitudes below 96, the output is 0.0, otherwise, the output is 1.0.

Gradient Magnitude Look-up Table

As shown in FIG. 3, the GMLUT 380 takes either $|G|$, or the most significant, for example, thirteen bits of $|G^2|$ as input. The selection through multiplexer 340 is controlled by the indexSource field 504 of the GMM register. The truncated magnitude squared is used if the indexSource signal is true, and the magnitude $|G|$ is used otherwise.

Using $|G|$ gives the user a linear function with GMLUT table entries spread at equal points across the selected gradient magnitude range.

However, the square root approximation can be prone to error so it may be advantageous to use $|G^2|$ directly. Using the most significant bits of the $|G^2|$ yields a non-linear function with GMLUT entries packed closer together at the lower end of the gradient magnitude range. This is actually desirable and intended because most attenuation of lighting will be done at the low-end of the gradient magnitude range.

The GMLUT is organized as 128 entries (entry0, . . . , entry127). Each entry is eight bits wide and stores a value in the range [0.0, . . . , 1.0]. The look-up is controlled by the grain, base, upperRangeDefault and lowerRangeDefault fields 501–504 of the GMM register 500. These fields allow the user to specify how the 128 table entries are spread across the table's 13-bit index range.

The base field 502 specifies where in the index range the first entry (entry0) of the table is indexed. The grain field 501 specifies how far apart the table entries are spread starting at the base entry. In other words, the grain is the size of the incremental value between the entries. If the table is programmed to cover less than the 13-bit index range, then the upper-RangeDefault and lowerRangeDefault fields 503–504 specify the GMLUT output value for the uncovered regions above and below, either region can be zero or one.

Figure 7:
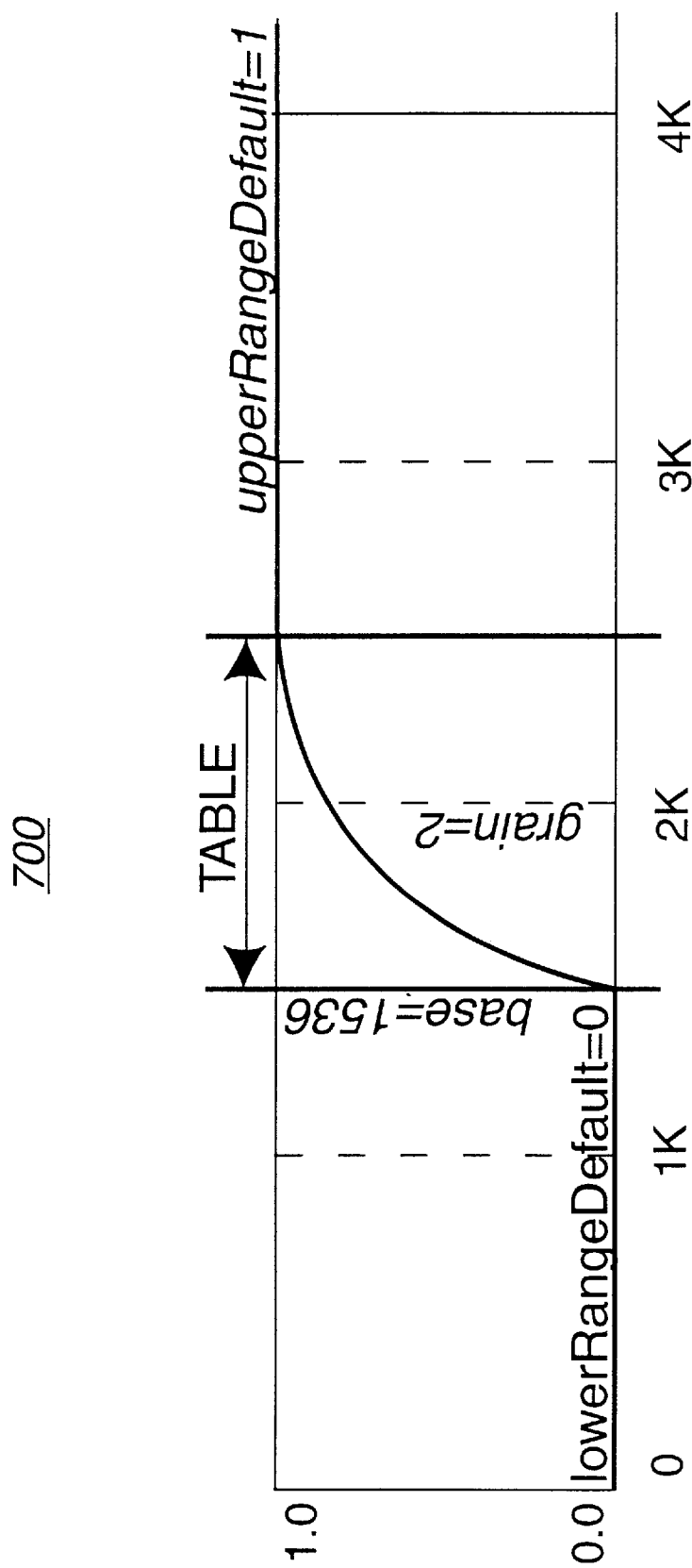
FIG. 7 is a block diagram of an attenuation function.

FIG. 7 shows an example complex attenuation function 700 where the x-axis indicates the gradient index in the range of [0, . . . , 4k−1], and the y-axis the GMLUT output value in the range [0.0, . . . , 1.0]. In this example, the base is 1536, and the grain is 2. Interpolation is performed between the two nearest table entries, and an 8-bit repeating fraction result is produced, again representing the range of [0.0, . . . , 1.0].

Reflectance Mapping

Figure 8A:
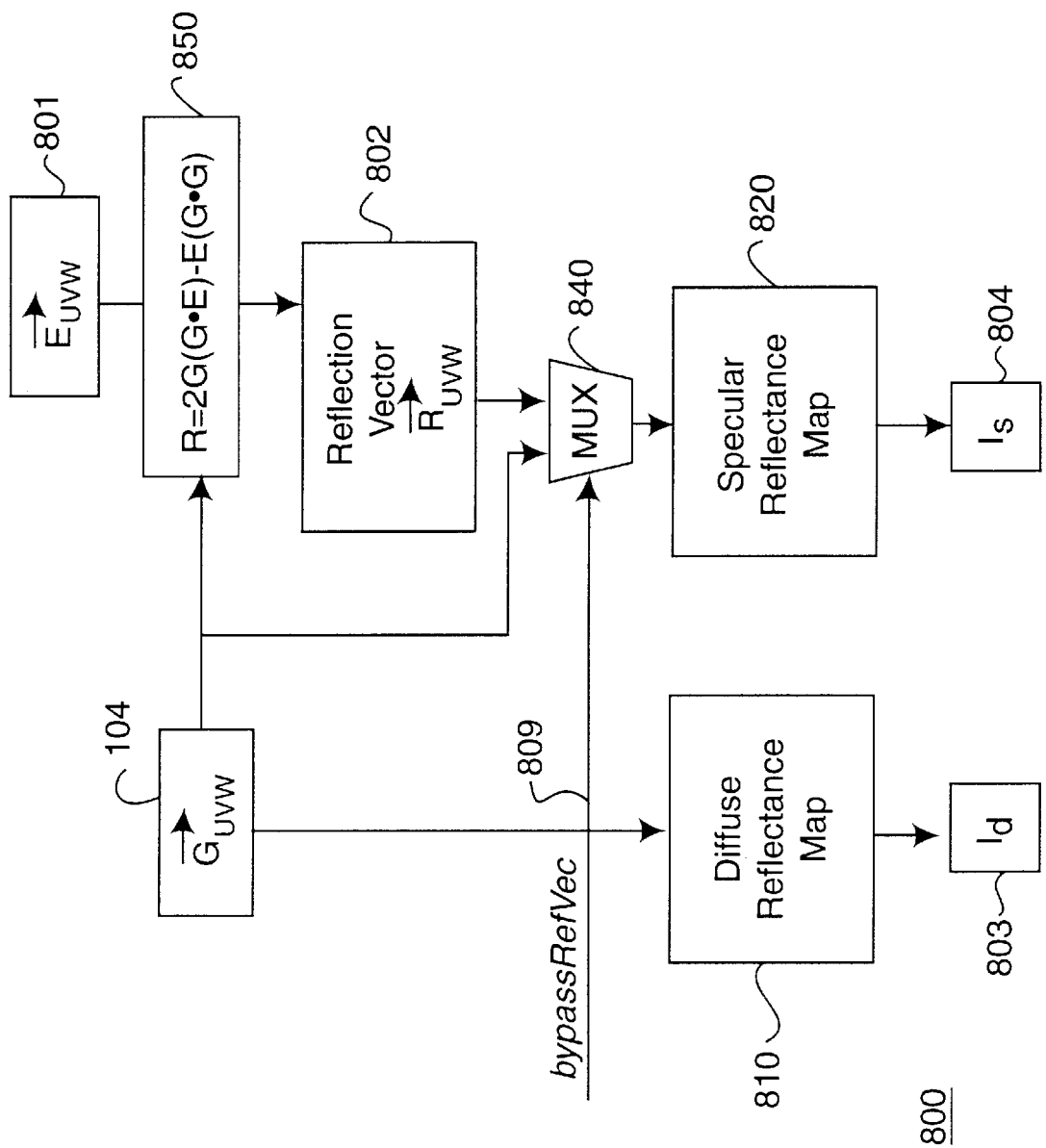
FIG. 8a is a block diagram of a reflectance mapping unit.

As shown in FIG. 8a, the reflectance mapping unit 800 includes a diffuse reflectance map 810, and a specular reflectance map 820. The unit also includes a reflectance vector circuit 850 for deriving a reflection vector 802 from an eye vector ($E_{UVW}$) 801 and the gradient vector 104 (see also FIGS. 8b and 10). A mux 840 selectively chooses to index the specular reflectance map directly with either the gradient vector or the computed reflection vector 802. The inputs to the units are the gradient and eye vectors 104, 801, and the outputs are the diffuse and specular intensities ($I_d$, $I_s$) 803–804.

The reflectance mapping unit 800 determines the specular and diffuse intensities ($I_s$ and $I_d$) for each sample 205 based upon its associated gradient vector 104 and the user-specified eye vector ($E_{UVW}$) 801. As shown, the diff-use map 810 is indexed by the sample's gradient vector 104, whereas the specular map 820 is typically indexed by either the gradient vector or the computed reflection vector 802 depending on a bypass (bypassRefVec) signal 901 shown in FIG. 9.

Figure 9:
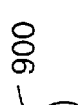
FIG. 9 is a block diagram of an eye vector register.

The maps and the indexing vectors are all specified in unpermuted (U,V,W) object space but relative to "physical" or "lighting" space. The advantage of this is that the reflectance maps do no have to be recalculated for different view directions. However, gradients estimated from anisotropic or non-orthogonal volume data sets must be corrected to "physical" space for the lighting calculations to work correctly. The specular map 820 may be indexed directly by the gradient vector 104, instead of by the reflection vector 802, by setting a bit in a bypassRefVec field 901 in an EyeVector register 900 to true as shown in FIG. 9. The other fields 902–904 of the register 900 respectively store the (U, V, W) components of the eye vector.

Reflection Vector

FIG. 10 shows the relationship between the eye, reflection, and gradient vectors. The eye vector 801 is defined to be the vector from the point on a "surface" of the volume 1000 to the eye 1001. Its coordinates are specified in (U, V, W) object space by fields 902-904. Note, this vector is normalized to a length of 1. The reflection from a light source 1002 to the eye 1001 is dependent upon the gradient vector 104.

Figure 8B:
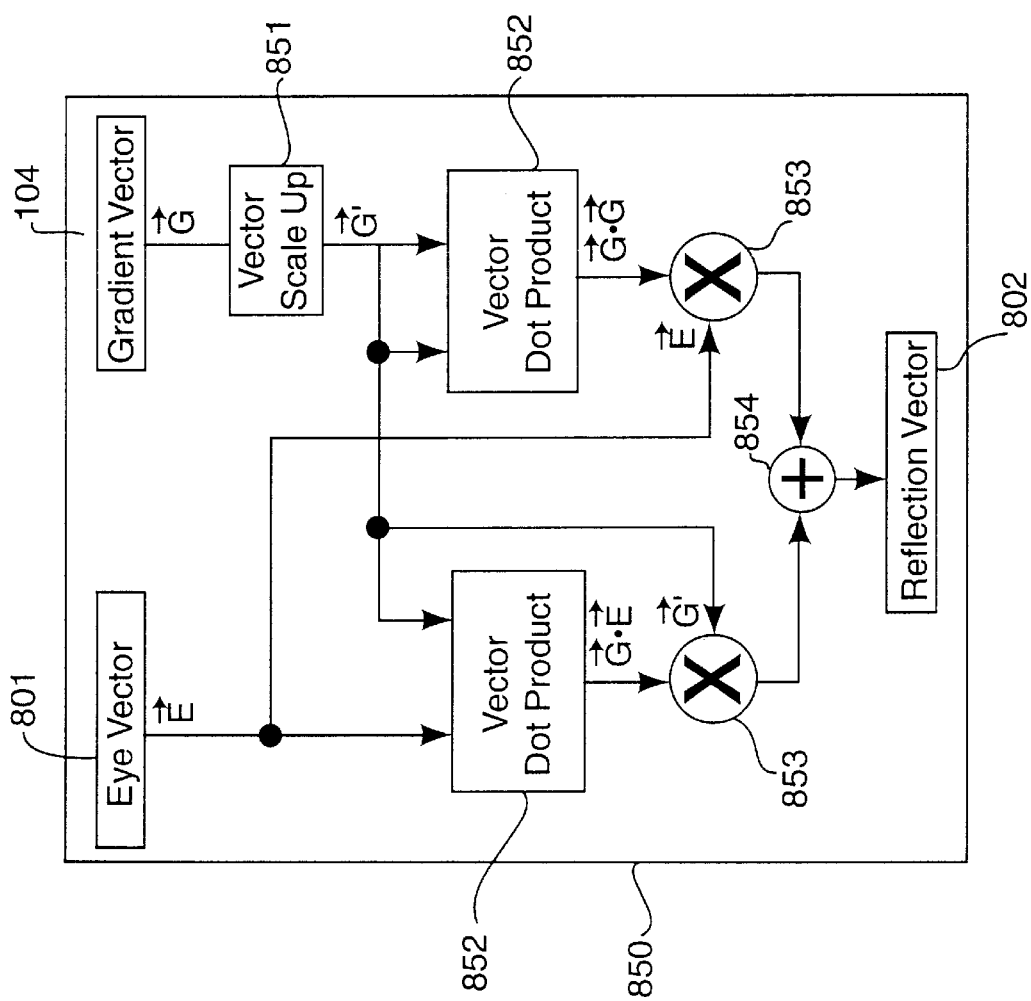
FIG. 8b is a block diagram of a circuit for computing reflection vectors.

As shown in FIG. 8b, the reflectance vector circuit 850 derives the reflection vector 802 based upon the eye vector 801 specified by the EyeVector register 900 and the gradient vector 104. The gradient vector is not of unit length, i.e., it is unnormalized. Using arithmetic logic units (scaling unit 851, two dot product generators 852, two multipliers 853, and adder 854), the circuit 850 determines an unnormalized reflection vector Ru as:

$$Ru=2*Gu*(Gu \cdot E)-E(Gu \cdot Gu)$$

where Gu is the unnormalized gradient vector, and Ru and E are the reflection and eye vectors, and · is the "dot product" operator of two vectors. Note, only the direction, and not magnitude, is important for the reflection vector to index the reflectance map.

Reflectance Map

As previously mentioned, the specular and diffuse reflectance maps use the same organization. Each reflectance map is organized as a table with, for example, 1536 entries. The entries are spread across the six faces of an imaginary cube in 3D, that is 256 entries on each face. Each face includes four quadrants of 64 entries. The index to the maps are the unnormalized gradient vector or the reflection vector as selected by the mux 840. Again, magnitude is not important, but direction is.

The outputs are values, interpolated from four entries of the map, based on the direction of the incoming vector. The selection of the face of the cube for access is based on the maximum vector component, and its sign. For instance, if the vector is (75,0,0) in (u,v,w) space, then the right face of the cube (positive U) would be chosen. Whereas, if the vector is (-75,0,0), then the left face of the cube is chosen. The quadrant of a face is then selected based upon the sign of the other two vector components.

Finally, a cluster of four neighboring table entries is selected for interpolation to a resultant intensity value. This neighborhood is selected by computing two weights that indicate the angle of deflection of the vector from the center of the cube's face to the outer edges of the face. Given that there are a power-of-two entries in each direction of a face's quadrant and the vector's components are represented by a power-of-two value, these weights can easily be derived by simple bit extraction of the vector's components.

Lighting

Figure 11:
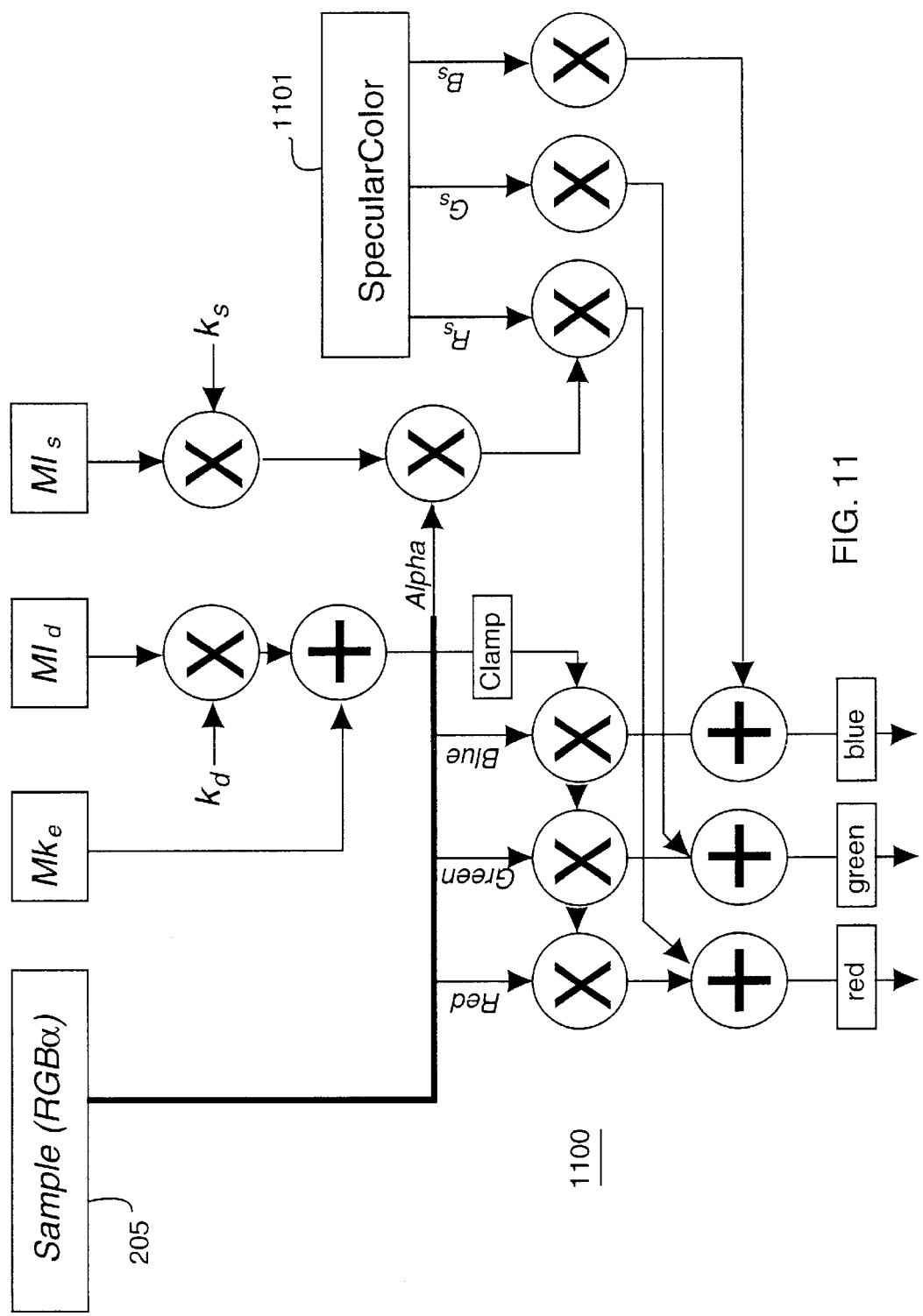
FIG. 11 is a block diagram of a lighting unit of the illumination stage.

FIG. 11 shows the lighting unit 1100 in greater detail. The unit comprises a number of arithmetic logic units (ALUs) that add ($\otimes$) and multiply ($\otimes$) signals derived by the modulation and mapping units, and clamps. The lighting unit 1100 applies the diffuse and specular lighting coefficients, $k_d$ and $k_s$, the modulated emissive, diffuse, and specular intensities ($Mk_e$, $MI_d$, $MI_s$), and the specular color ($R_s$, $G_s$, $B_s$) 1101 to the classified RGBa sample 205.

The lighting equations, implemented by the ALUs, for each of the three color channels can be stated as follows:

$$Red=[((MI_d*k_d)+Mk_e)*Ra_{sample}]+[(MI_s* k_s)*(R_{specular}*a_{sample})]$$

$$Green=[((MI_d*k_d)+Mk_e)*Ga_{sample}]+[(MI_s*k_s)*G_{specular}*a_{sample})]$$

$$Blue=[((MI_d*k_d)+Mk_e)*Ba_{sample}]+[(MI_s*k_s)*B_{specular}*a_{sample})]$$

Gradient Magnitude Square Root Approximation

As stated above, the gradient magnitude |G| is derived from a square root approximation of |G²|. The approximation is based on a Newton-Raphson approximation. Generally, Newton's method involves numerous iterations to find the square-root of an input number. Recall from above the input is:

$$|G^2|=(G_U*G_U)+(G_V*G_V)+(G_W*G_W)$$

For the purpose of determining the gradient magnitude, the accuracy of the square root is not as critical as the number of gates in a pipelined hardware implementation. Therefore, this embodiment uses a one step version of the method.

The next section will discuss the Newton-Raphson method for approximating square roots that is commonly used in the prior art in an iterative non-pipelined fashion, followed by the details on a preferred implementation for a pipeline method, and its advantages over prior art approximations. The method is extended to a general function approximation.

Newton-Raphson

The Newton-Raphson method is an iterative algorithm, based on tangents and their midpoints along a specified curve, in this case, the square root curve. The method works as follows:

1. First, an intelligent guess (g) of the answer is derived based on the input number (n).
2. Next, the result of dividing the input number by the guess is derived (div):

div=n/g

3. Then, an error is computed to determine how far off the guess was:

error=|div-g|

If g had been the exact answer, it is easy to see how the error would be zero.
4. If the computed error is too large, a new guess is ventured by computing the midway point along a tangent, defined by a line drawn between the current guess (g) and div, as follows:

g=½*(g+div)

5. Steps 2 through 4 are repeated (iterated) until the error is within acceptable limits.

Figure 12:
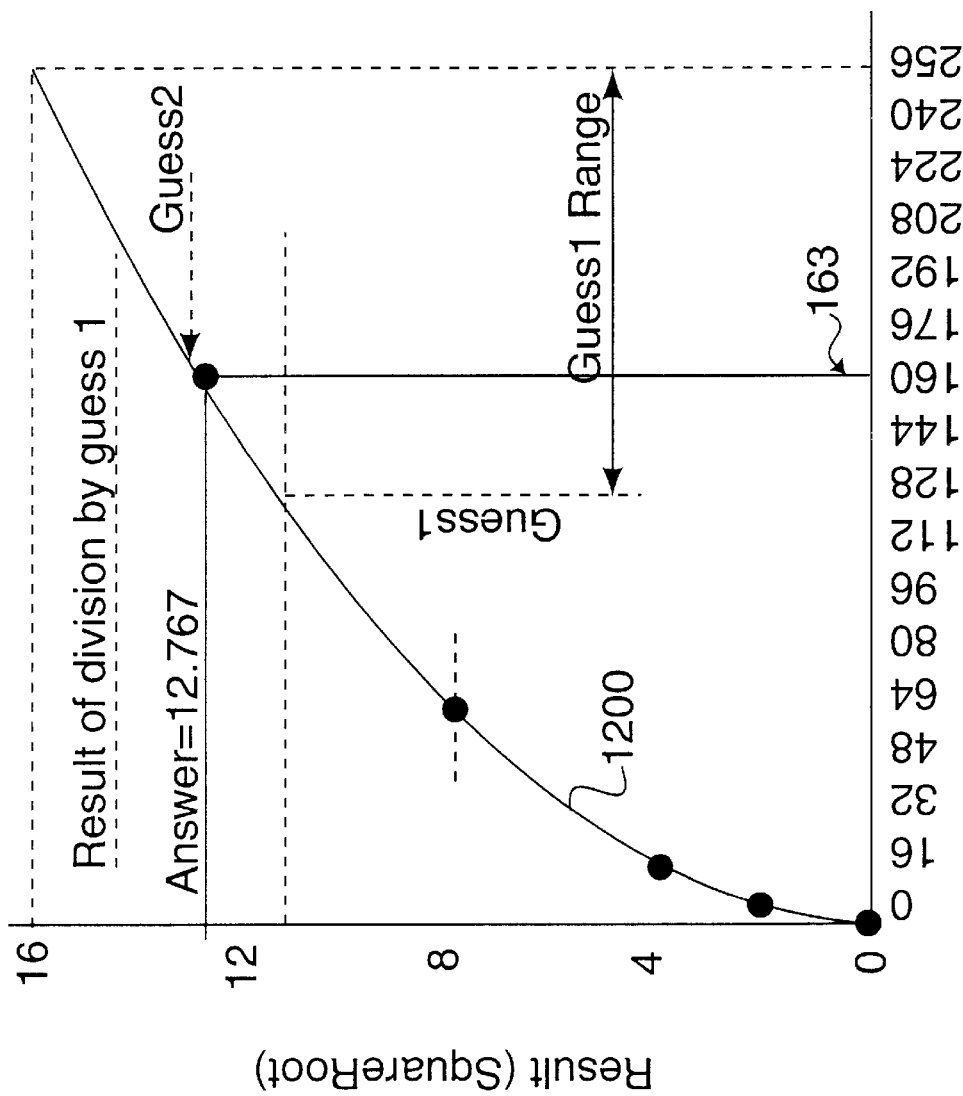
FIG. 12 is a graph the Newton-Raphson square root approximation.

FIG. 12 graphically shows the Newton-Raphson method for an example number 163. In FIG. 12, the x-axis indicates the input number, and the y-axis the square root. The curve 1200 plots the square root function. The input number (163 is located between the two power-of-two numbers: 128 ($2^7$ and 256 ($2^8$). Thus the computed square root of the lower bound (128) is chosen for the first guess. This is 11.3137. The division result, dividing the input number (163) by the guessed answer 11.3137 yields 14.4073. This results in an error of 3.093 (14.4073−11.3137). The next guess is computed as follows:

NewGuess=½*(11.3137+14.4073)=12.8605

This process would then continue to whatever precision is desired. The correct answer is 12.767145.

Note, this method uses both division and iteration. Division is extremely expensive in circuitry, and iteration inconsistent with a pipelined architecture. The multiplication by ½ can be accomplished by a simple shift right of the binary number. There are also a subtraction and possible complement, e.g., another adder, and an addition required for each iteration.

Prior Art Hardware Implementations

Most prior art hardware implementations of Newton-Raphson's method for approximating a square root use an iterative, non-pipelined implementation. This is in order to reduce the number of required gates for the design. If the typical design is converted to a pipelined implementation, the divider, adders, and subtracter would have to be replicated in successive pipeline stages, once for each iteration. Moreover, a pipelined implementation cannot support a variable number of steps; instead, circuitry would have to be replicated as many times as the maximum number of guesses. This would result in an large number of gates. Many implementations take as many as 20 or 30 iterations to compute a result which would introduce a huge amount of delay and circuitry into a pipelined architecture.

As an example implementation, the Synopsys company offers a square root circuit (DW02_sqrt: Combinatorial Square Root) in their DesignWare library based on Newton-Raphson, see "www.synopsys.com." These are non-pipelined devices of which there are two variants with the following typical characteristics: either 300 ns and 9000 gates, or 600 ns and 1100 gates based on a cycle time of approximately 10 nanoseconds. These, of course, reuse the same divider, adder, and subtraction circuits for each of 30–60 iterations, precluding pipeline operation.

Pipelined Square Root

A preferred implementation is based on Newton-Raphson's method but varies significantly in that it is pipelined. The present implementation employs only one iteration and assumes predefined estimates of the square root at predefined points along the curve 1200 and tangents with pre-defined "slopes" connected, end-to-end, to approximate the square root function. As a further requirement in order to minimize the number of gates, division and multiplication are not used, and all computations are merely shifts and adds.

The invention takes advantage of the fact that the square root of a number expressed as a power-of-two ($2^n$) is $2^{n/2}$. So, a first approximation is made by a simple range determination. For a given input find a nearest power-of-two number, and use its square root as the first guess. Now, if the range check is done for odd powers-of-two (i.e., in $2^n$, n is odd), the first approximation will be in the middle of a range reducing the largest possible error by half.

Figure 13:
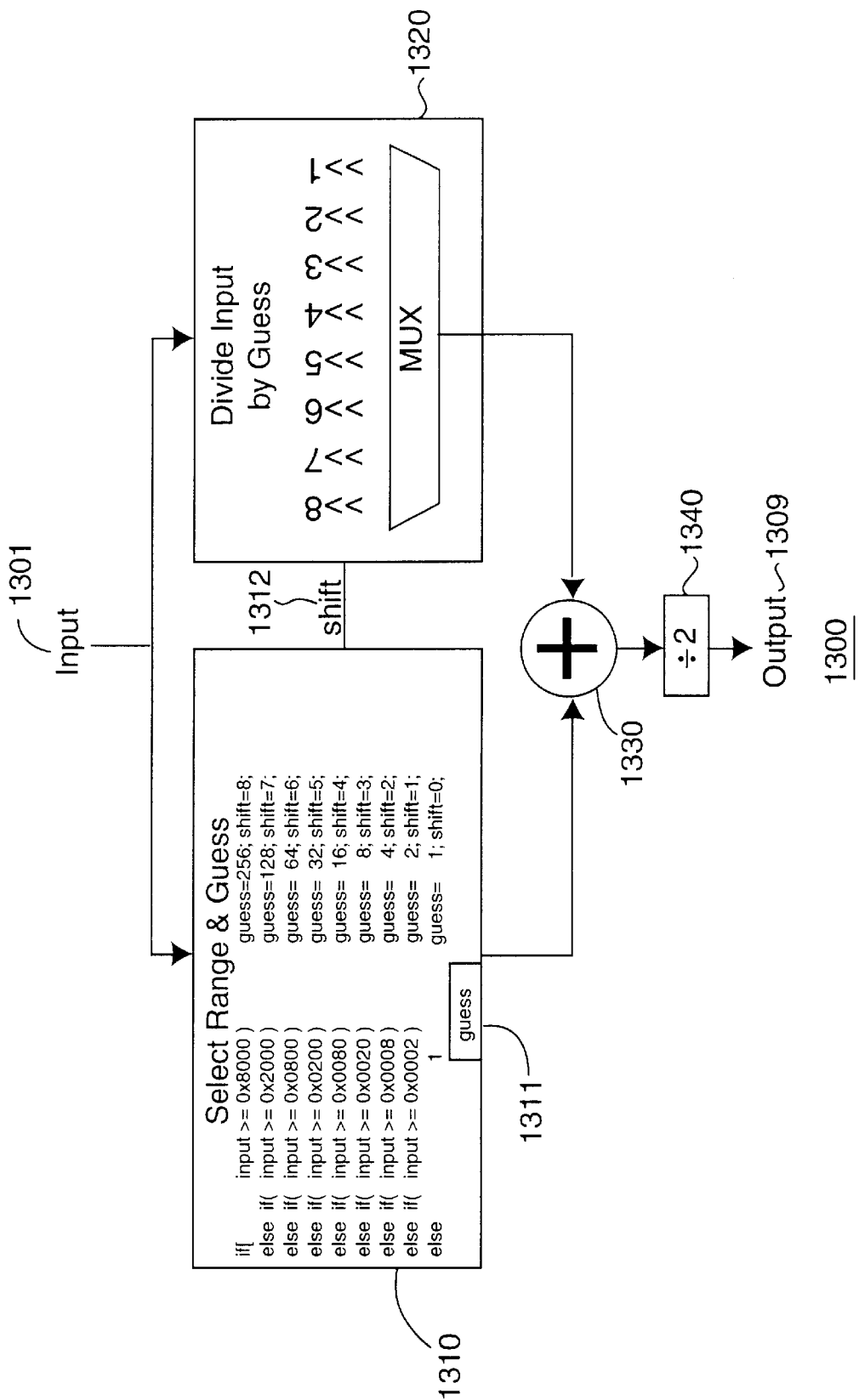
FIG. 13 is a block diagram of a pipelined square root approximation unit.

FIG. 13 is a block diagram of a preferred implementation of a square root approximation unit 1300. The unit includes a combinatorial logic block 1310 labeled "Select Range & Guess," another block of combinatorial logic 1320 labeled "Divide Input by Guess," an adder 1330, and a shifter 1340. The unit 1300 takes a number (for example, $|G^2|$) as input 1301, and produces an approximated square root as output 1309.

Essentially, the block 1310 determines guess 1311 and shift 1312. The value guess is the nearest square root, expressed as a power-of-two number, of a largest odd power-of-two number less than or equal to input. This range test can be implemented as a simple bit test operation. The range test can begin at 32,768 (hex 0x8000 or $2^{15}$) which has a nearest square root of 256 ($2^8$). In other words, because n is odd, the root is "guessed" as $2^{(n+1)/2}$. The corresponding initial guess is 256, and shift is 8.

Block 1320 divides input by guess. Because guess is a power-of-two, the divide can be done as simple shift (">>") operation. The adder 1330 adds guess to the result of input/guess, The shifter 1340 implements the final divide by two:

output=(guess+(input/guess))/2, or output=($2^{(n+1)/2}$+(input/$2^{(n+1)/2}$)/2.

By choosing a good value for guess, that is make n odd, the approximation is more accurate.

Because guess is always a power-of-two, the divide is simplified to a shift of the input. Then, according to the Newton-Raphson method, the guess is added to the result of dividing the input by the guess by the adder 1330. The sum is then divided by two in the shifter 1340 to give a close approximation of the square root of the input.

Taking the same example as was used above, if the input is 163, then the input >=0x0080 or 128 ($2^7$), and the guess is 16 (shift 4), and output=(16+(163/16))/2=13, that is, the square root of 163 rounded to the nearest integer.

Figure 14:
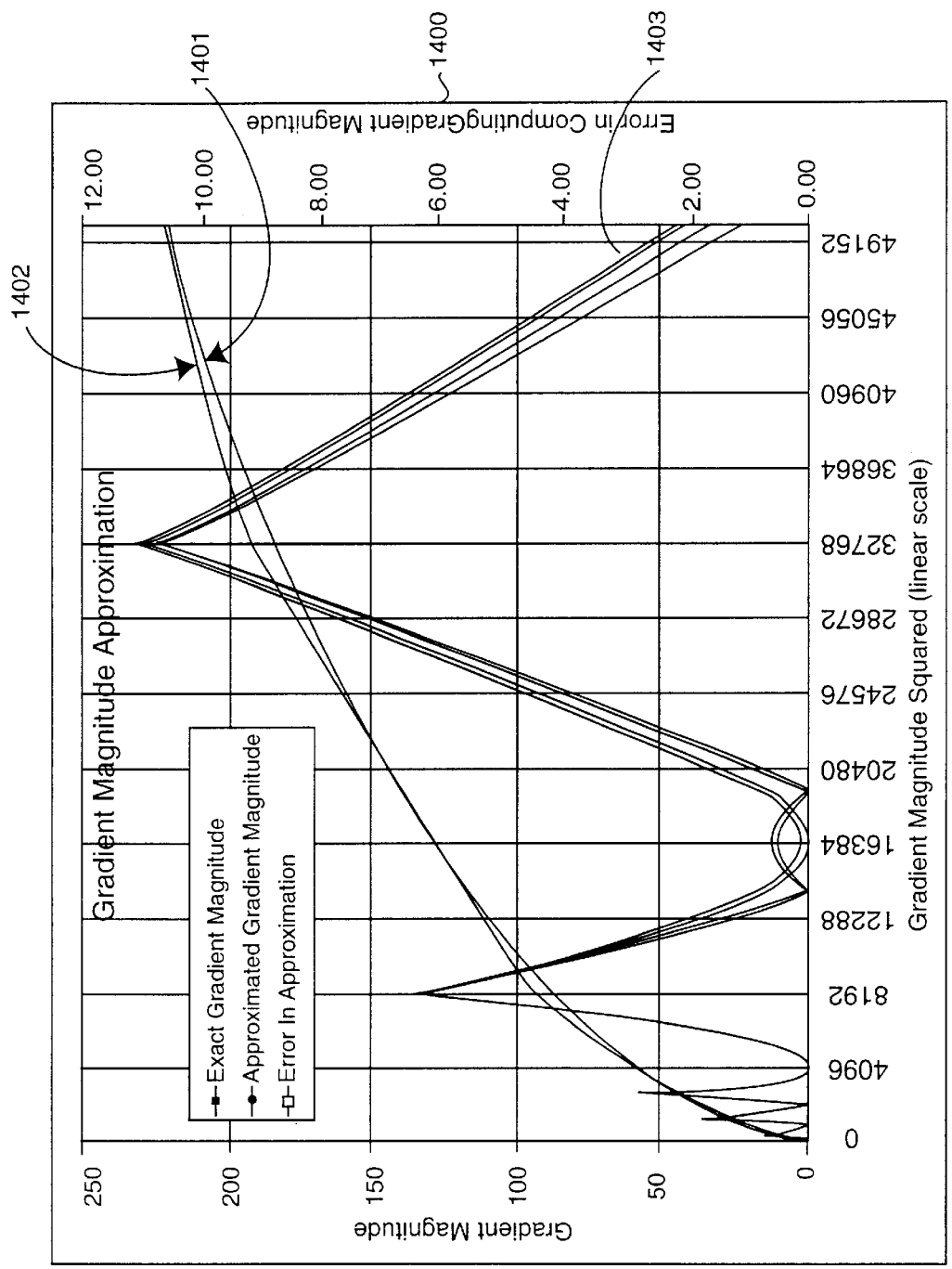
FIG. 14 is a graph comparing approximation results.

FIG. 14 is a graph 1400 comparing the exact gradient magnitude 1401 with the approximate gradient 1402, and the error in the approximation 1403.

This circuit requires a very small number of gates to implement. Additionally, the circuit is well suited to a pipelined design as the logic may be spread over as many pipe stages as desired without having to replicate any logic because no loops or iterations are involved. An actual implementation of the circuit 1300 takes 850 gates and has a propagation delay of 5 nanoseconds, compared with 300 Ns and 9000 gates from above.

Generalized Function Approximation

At first blush, it might appear that the above described single iteration of Newton-Raphson can easily be extended to a fixed number of additional iterations in a pipelined fashion to improve precision. However, the method described above relies on all computations involving powers-of-two. This will no longer be the case in a second, follow-on iteration. In the second iteration, it is necessary to use the result from the first iteration in the divide operation. The result will most likely not be a power-of-two number, so a complex divider circuit would have to be used, which would be very costly in gates and delays.

However, the method can be improved to provide a better approximation without increasing the number of iterations, but rather by piecewise linear approximation of the square-root function that involves division by a fixed set of numbers that are not powers of two. The set of numbers is chosen so that division can still be accomplished by a small number of shifts and adds in a fixed number of steps.

Consider for example the range of guesses 1310 in FIG. 13. Suppose that the difference between possible guesses 128 and 256 is too great for the level of accuracy desired. It really is desired to select a guess part way between these two, and still be able to obtain the quotient input/guess efficiently. One way is to take the average of input/128 and input/256, a number that is easy to compute with an additional adder and shift. Let n be the input number as above. Then the average $(n/128)+(n/256))/2$ is given by $$((n/128)+(n/256))/2=(n/256+2n/256)/2=3n/512=n/(512/3).$$

That is, simply sum the number n shifted by seven bits with the number n shifted by eight bits, then shift the result by one bit. This turns out to be the same as dividing n by 512/3, which is approximately 170.667, or nearly 171.

The division is accomplished with an adder and two shifts, which is much more effective than a full divider circuit.

The effect is to decrease the size of the ranges for the first guess by doubling the number of points at which first "guess" is taken of the square root of the input. This reduces the maximum error shown in FIG. 14 in this modified single-step approximation of the square root.

Note that the precision of the approximation can be increased even more by increasing the number of adders and shift operations performed in the single step. For example, the following $3^{rd}$ order approximation requires two adders and three shifts (">>"):

$$n/256=n>>8$$

$$n/128=n>>7$$

$$n/171\approx(n/256+n/128)>>1$$

$$n/204\approx(n/256+n/171)>>1=(n/256+((n/256+n/128)>>1))>>1$$

$$n/146\approx(n/171+n/128)>>1=(((n/256+n/128)>>1)+n/128)>>1$$

Another way of considering this is to note that by combining different shifted-down values in different ways, many differently sloped tangents can be produced along the curve representing the square root function. In a preferred method, the starting point is selected from a range including the input number, and the sloped" tangent to be applied from that point to the next range.

In general, suppose that the range of the square root function has the following predetermined guesses:

$$g_0, g_1, g_2, \ldots, g_i, g_{i+1}, \ldots$$

where the $g_i$ are chosen so that division can be accomplished by a fixed set of circuitry in a fixed amount of time. Then the choice of guesses can be predetermined to minimize the amount of error between the guess and the actual square root. Specifically, if the input value n lies between $g_i^2$ and $g_{i+1}^2$, then the error in the approximation based on the these two guesses will be $$\tfrac{1}{2}(n/g_i-g_i) \text{ and } \tfrac{1}{2}(g_{i+1}-n/g_{i+1}),$$

respectively. The value of n below which $g_i$ is a better guess and above which $g_{i+1}$ is a better guess is the value for which these two errors are equal—i.e., for which $$\tfrac{1}{2}(n/g_i-g_i)=\tfrac{1}{2}(g_{i+1}-n/g_{i+1}).$$

Solving for n, it can be seen that if $n<g_i^* g_{i+1}$, then $g_i$ is the better guess, otherwise $g_{i+1}$ is the better guess.

Therefore, for the sequence of guesses $g_0, g_1, g_2, \ldots, g_i, g_{i+1}$, there is a corresponding sequence of selection ranges $g_0^*g_1, g_1^*g_2, g_2^*g_3, \ldots, g_i^* g_{i+1}, \ldots$ against which n is tested in block 1310 of FIG. 13. So rather than having guesses spaced at odd powers-of-two in large ranges that are powers-of-four apart (2, 8, 32, 128, 512, 2K, 8K, 32K) as in block 1311, one can have them spaced any difference apart, even different distances for the same function.

While this description is specific to the square root function, the method and apparatus as described above can be generalized to approximating any function, linear or non-linear. The function resolved is represented by sufficient connected tangents to approximate the function. Starting points defining the range of the tangents can be stored as a table along with the initial guesses and slopes. Then, simple logic similar to the logic described with reference to FIG. 13 can be used to approximate arbitrary functions to whatever level of precision with a minimal number of gates in a pipelined manner.

It is to be understood that various other adaptations and modifications may be made within the spirit and scope of the invention. Therefore, it is the object of the appended claims to cover all such variations and modifications as come within the true spirit and scope of the invention.

We claim:

1. An apparatus for illuminating samples in a volume rendering pipeline, comprising:

a gradient magnitude modulation unit producing an opacity, emissive, diffuse and specular modulation factor from a gradient magnitude vector of each sample;

a reflectance mapping unit producing a diffuse intensity and a specular intensity from the gradient magnitude vector of each sample and an eye vector of the volume;

a first arithmetic logic unit combining an opacity of each sample with the corresponding opacity modulation factor to generate modulated opacities;

a second arithmetic logic unit combining an emissive coefficient with the emissive modulation factor of each sample to generate modulated emissive coefficients;

a third arithmetic logic unit combining the diffuse intensity with the diffuse modulation factor of each sample to generate modulated diffuse intensities;

a fourth arithmetic logic unit combining the specular intensity with the specular modulation factor of each sample to generate modulated specular intensities; and a lighting unit applying the modulated emissive coefficient, modulated diffuse and specular intensities to color components of the samples to illuminate the volume sample.

2. The apparatus of claim 1 wherein the arithmetic logic units are multipliers.

3. The apparatus of claim 1 wherein the gradient magnitude modulation unit produces a valid signal to indicate whether the gradient magnitude lies within a predetermined range.

4. The apparatus of claim 1 wherein the reflectance mapping unit produces a sign for a dot product of the eye vector with each gradient magnitude vector to indicate whether the gradient vector is front-facing or back-facing.

5. The apparatus of claim 1 wherein one sample and one gradient magnitude vector is processed each pipeline clock cycle.

6. The apparatus of claim 1 wherein the gradient magnitude modulation unit filters the modulated opacity, emissive, diffuse and specular modulation factors using a step function.

7. The apparatus of claim 1 wherein the gradient magnitude modulation unit filters the modulated opacity, emissive, diffuse and specular modulation factors using a complex function.

8. The apparatus of claims 6 or 7 wherein the gradient magnitude modulation unit selectively filters the opacity, emissive, diffuse and specular modulation factors using the step function and the complex function depending on user supplied control parameters.

9. The apparatus of claim 7 wherein the complex function is selectively derived from the magnitude of the gradient vector or a truncated squared magnitude of the gradient vector.

10. The apparatus of claim 1 wherein the samples are classified in a previous stage of the rendering pipeline.

11. The apparatus of claim 1 wherein the illuminated samples are composited as pixels in a next stage of the pipeline.

12. A method for illuminating samples of a volume in a rendering pipeline, comprising the steps of:

producing an opacity, emissive, diffuse and specular modulation factor from a gradient magnitude vector of each sample in a gradient magnitude modulation unit;

producing a diffuse intensity and a specular intensity from the gradient magnitude vector of each sample and an eye vector of the volume in a reflectance mapping unit;

combining an opacity of each sample with the corresponding opacity modulation factor to generate modulated opacities;

combining an emissive coefficient with the emissive modulation factor of each sample to generate modulated emissive coefficients;

combining the diffuse intensity with the diffuse modulation factor of each volume sample to generate modulated diffuse intensities;

combining the specular intensity with the specular modulation factor of each sample to generate modulated specular intensities; and applying the modulated emissive coefficient, modulated diff-use and specular intensities to color components of the volume samples to illuminate the sample.

* * * * *

UNITED STATES PATENT AND TRADEMARK OFFICE
CERTIFICATE OF CORRECTION

PATENT NO.    : 6,342,885 B1                                      Page 1 of 1
DATED         : January 29, 2002
INVENTOR(S)   : Knittel et al.

It is certified that error appears in the above-identified patent and that said Letters Patent is hereby corrected as shown below:

Title page,
Item [63], Related U.S. Application Data, replace "09/190,643" with -- "09/190,634 --;

Column 1,
Line 9, replace "09/190,643" with -- 09/190,634 --.

Signed and Sealed this

Twenty-ninth Day of October, 2002

*Attest:*

JAMES E. ROGAN
*Attesting Officer*    *Director of the United States Patent and Trademark Office*